July 31, 1956  G. D. FORBES  2,757,285
TEST SIGNAL GENERATOR
Filed Sept. 17, 1952  2 Sheets-Sheet 2

INVENTOR.
GORDON DONALD FORBES
BY James S. Shannon
AGENT
Wade Lovitz
ATTORNEY

United States Patent Office 2,757,285
Patented July 31, 1956

2,757,285
TEST SIGNAL GENERATOR

Gordon Donald Forbes, Sudbury, Mass., assignor to the United States of America as represented by the Secretary of the Air Force Application September 17, 1952, Serial No. 310,045

7 Claims. (Cl. 250—27)

This invention relates to apparatus for generating a signal to be used in testing and adjusting moving target indicating radar systems, usually referred to as MTI systems.

As is known, all MTI radar systems utilize the Doppler effect to distinguish between fixed and moving targets. In cases where the radar station itself is moving, as when mounted on a ship or airplane, means have been devised for compensating for the velocity of the station so that the video signals produced by fixed and moving MTI stations are similar. In the MTI video signal stationary targets are represented by pulses of either polarity which remain substantially unchanged in successive signals. Moving targets, on the other hand, are represented by pulses which vary in amplitude and polarity at the Doppler frequency. In order to eliminate the video signals representing stationary targets a process of cancellation is employed in which each video signal is delayed by an amount of time equal to the interval between transmitted pulses and is subtracted from the undelayed succeeding video signal. Since the signals representing stationary targets do not change in successive occurrences they are cancelled, while in the case of moving target signals the Doppler amplitude variation prevents complete cancellation and a resultant signal is produced.

It is the object of this invention to provide a test signal generator for producing a signal simulating an MTI video signal which may be used to test and adjust the cancellation circuit of an MTI receiver. The generator produces two pulses, one representing a fixed target and the other a moving target. The pulse representing the fixed target is of fixed amplitude but selectively of either polarity. The moving target pulse varies in amplitude sinusoidally and alternates in polarity with the half-cycles of the sinusoidal variation. Means are provided for delaying each pulse with respect to a trigger pulse, representing the transmitted pulse, by an amount variable up to an interval not greater than the time interval between transmitted pulses. Means are also provided for applying the two pulses to a common output circuit and for attenuating the moving target pulse relative to the stationary targe pulse.

Figure 1:
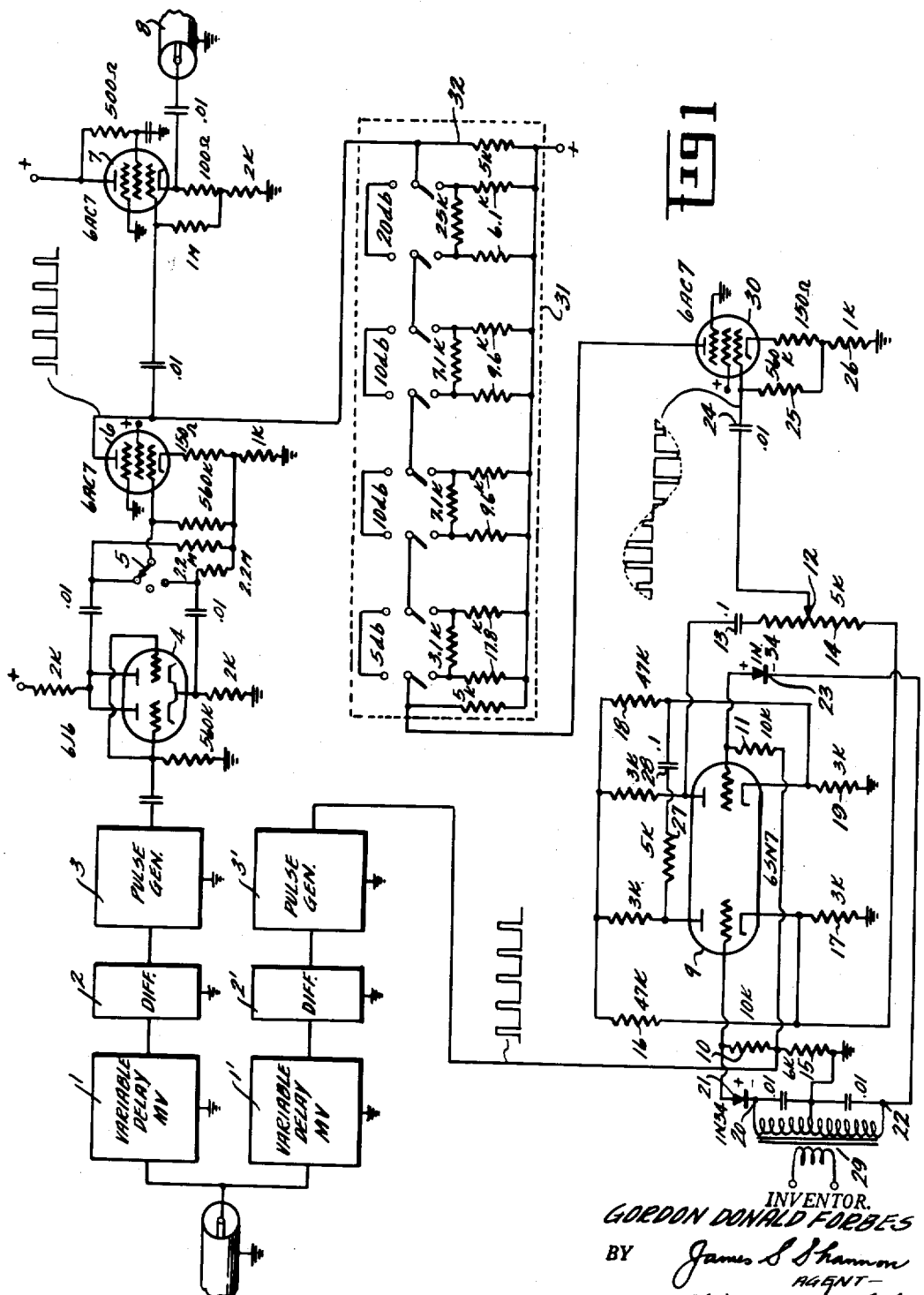
Figure 2:
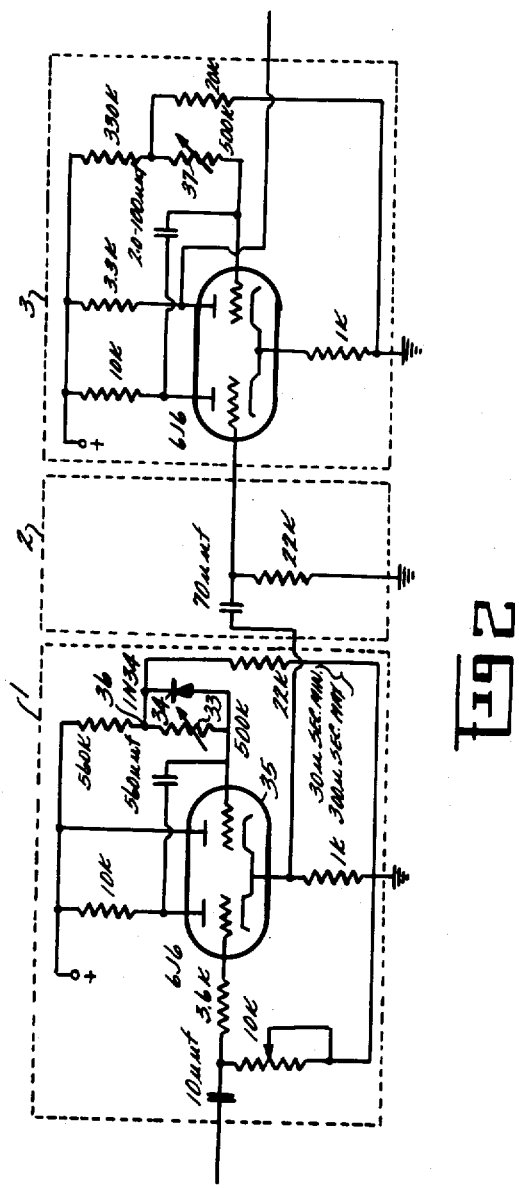

The details of the invention will be more completely explained in connection with the embodiment thereof shown in the accompanying drawings, in which Fig. 1 shows the circuit diagram of the test signal generator; and Fig. 2 shows the circuit diagrams of a suitable delay multivibrator, pulse generator and differentiating circuit for use in Fig. 1.

Referring to Fig. 1, trigger pulses at a constant repetition rate equal to the repetition rate of the MTI system being tested are applied to delay multivibrator 1. This multivibrator produces a delayed pulse which can be varied in length from zero to a length only slightly less than the time interval between trigger pulses.

The trailing edge of the delay pulse is differentiated in circuit 2 to produce a trigger pulse which is applied to pulse generator 3. This generator produces a pulse which is similar to the video pulse representing a stationary target in an MTI receiver. This pulse is applied to a paraphase circuit for conversion into two pulses of equal amplitude and opposite polarity. The paraphase circuit comprises a dual triode 4 with the electrodes of the two elements connected in parallel. The pulse generated by circuit 3 is applied to the parallel connected grids of the dual triode 4. The load impedance is divided equally between the anode and cathode circuits of the parallel triodes and the two pulses of opposite polarity are taken from the anodes and cathodes of the tube. A switch 5 is used to select either the positive or the negative pulse and apply it to the control grid of mixer tube 6. The output of mixer tube 6 is applied to the control grid of the cathode follower output stage 7 and thence to the output circuit represented by the coaxial conductor 8.

The initial trigger pulses are also applied to variable delay multivibrator 1' which is similar in all respects to multivibrator 1. The trailing edge of this delay pulse is also differentiated by circuit 2' and the resulting trigger pulse applied to pulse generator 3' for generating a series of positive constant pulses to be used to generate the moving target simulating video pulses. By adjusting the length of the pulses generated by multivibrators 1 and 1' it is possible to cause the pulses generated by circuits 3 and 3' to occur at any desired time after the initial trigger pulses.

The dual triode 9 is part of a circuit which may be termed an in-phase pulse canceller which operates to convert the series of positive constant amplitude pulses generated by circuit 3' into a series of pulses in which the amplitude of the pulses varies sinusoidally and the polarity of the pulses is opposite in each half-cycle of the sinusoidal variation. The pulse series produced by generator 3' is applied to the grids of tube 9 in parallel through resistors 10 and 11 and across resistor 15. The grids of the two triode sections are biased slightly beyond the cut-off point by potential dividers formed by resistors 16—17 and 18—19. The potential of the grid of the left-hand section of the tube is prevented from exceeding the potential of point 20 by means of unidirectional device 21 which may be, for example, a germanium diode. Similarly the grid of the right-hand section of tube 9 is prevented from exceeding the potential of point 22 by a similar unidirectional device 23. The output signal from the right-hand triode is taken from its anode and is applied through condenser 13 and the upper portion of resistor 14 to point 12. The output signal of the left-hand triode section is taken from its cathode and is applied through the lower portion of resistor 14 to point 12. The output signal of the circuit appears between point 12 and ground, point 12 being connected to ground through condenser 24 and resistors 25 and 26. The resistor 27 and condenser 28 serve as a neutralizing device to prevent oscillation of the circuit. A sinusoidal voltage of the Doppler frequency is applied to the primary of transformer 29, the secondary of which is center tapped and connected to the ground. Therefore, sinusoidal voltages of opposite phase appear between points 20 and 22 and ground.

The operation of the moving target signal generator is as follows: With the zero voltage across the secondary of transformer 29 so that points 20 and 22 are at ground potential the contact 12 on potentiometer 14 may be adjusted until the output of the circuit is zero. This is true because the output signals of the right and left-hand sections of tube 9, being taken from the anode and cathode of the respective sections, are of opposite phase and therefore cancel at point 12. This point is made adjustable in order to compensate for slight differences in outputs of the two triode sections. When the circuit is thus balanced it will have no output so long as there is no alternating voltage applied to the transformer 29. In the presence of an alternating voltage, however, either one or the other of the triode sections will be operative depending upon the polarity of the alternating voltage at the instant, the output amplitude being proportional to the amplitude of the alternating voltage at the instant. To illustrate this assume that the instantaneous value of the alternating voltage is such as to make point 20 positive with respect to ground and point 22 negative with respect to ground. This will raise the potential of the cathode of the diode 21 above ground by an amount equal to the instantaneous value of the alternating voltage. Therefore, when a positive pulse from generator 3' is applied to the grid of the left-hand triode section the potential of the grid will be permitted to rise an amount equal to the potential between the point 20 and ground. When these two potentials become equal, however, the diode begins to conduct and permits no further increase in potential of the grid. Therefore, the potential produced on the grid by the pulses applied to it is always equal to the concurrent value of the alternating voltage between point 20 and ground. Since during this half-cycle the point 22 is negative with respect to ground, the grid of the right-hand section of the tube 9 by the above described process, can not exceed the potential of this point, and the tube, which was initially biased slightly beyond cut-off, is completely inoperative. The only pulses appearing in the output during this half-cycle therefore are the positive pulses produced by the left-hand section of the tube 9. During the next half-cycle of the alternating voltage, however, conditions are reversed and point 22 is positive with respect to ground while point 20 is negative with respect to ground. Under these conditions the right-hand section of tube 9 only is operative and the only output pulses produced are the negative pulses produced by this section. The resulting wave form at point 12 is illustrated in Fig. 1.

The output signal of the above described circuit is applied to the grid of the mixer 30. The output of mixer 30 is applied through attenuator 31 to the resistor 32 which is also the load resistor of the mixer tube 6 and therefore has the output signal representing the stationary target also developed thereacross. The moving target signal therefore is also applied to the grid of the cathode follower output stage 7 and thence to the output circuit 8. The attenuator 31 is used to adjust the amplitude of the moving target signal relative to that of the fixed target signal.

The delay multivibrators 1 and 1', differentiating circuits 2 and 2', and the pulse generators 3 and 3' may be of any type capable of performing the required functions. Suitable circuits for this purpose are shown in Fig. 2. The delay multivibrator 1 is a conventional cathode-coupled type, the length of the delay being variable through variation of resistor 33. Unidirectional device 34, which may be a germanium diode, serves to prevent the potential of the grid of the right-hand section of tube 35 from exceeding the potential of point 36, thereby preventing too great an up-swing on the trailing edge of the delay pulse and thus producing a more nearly rectangular wave shape. Differentiating circuit 2 is of the conventional resistor-condenser type. The pulse generator 3 is a multivibrator similar to multivibrator 1 in which the lengths of the pulses may be adjusted by changing the value of variable resistor 37.

I claim:

1. A test signal generator for moving target indicator radar receivers comprising means for applying a series of trigger pulses of constant repetition rate thereto, a first and a second pulse generator, means for initiating operation of each pulse generator an adjustable interval of time after each trigger pulse, said interval being less than the interval between trigger pulses, means for converting each of the pulses generated by said first pulse generator into two pulses of equal amplitude and opposite polarity, an output circuit, means for selecting pulses of one polarity and applying same to said output circuit, means for converting the pulses generated by said second pulse generator into a series of pulses the amplitudes of which vary sinusoidally at a Doppler frequency and the polarities of which are opposite in the two half-cycles of the sinusoidal variation, and means for applying said sinusoidally varying pulses to said output circuit.

2. A test signal generator for moving target indicator radar receivers comprising means for applying a series of trigger pulses of constant repetition rate thereto, a first and a second pulse generator, means initiating operation of each pulse generator an adjustable interval of time after each trigger pulse, said interval being less than the interval between trigger pulses, means for converting each of the pulses generated by said first pulse generator into two pulses of equal amplitude and opposite polarity, an output circuit, means for selecting pulses of one polarity and applying same to said output circuit, a pair of similar vacuum tube stages each having one-half of the tube load impedance between the anode of the tube and a point of reference potential and the other half of the load impedance between the cathode and said point of reference potential, means for biasing said tubes slightly beyond the cut-off point, means for applying the pulses produced by said second pulse generator to the grids of said tubes in parallel, means for placing equal amplitude oppositely phased sinusoidally varying limitations on the maximum potentials of the grids of said tubes, and means for applying the signals appearing on the anode of one of said tubes and the cathode of the other of said tubes in parallel to said output circuit.

3. A test signal generator for moving target indicator radar receivers comprising means for applying a series of trigger pulses of constant repetition rate thereto, a first and a second positive pulse generator, means initiating operation of each pulse generator an adjustable interval of time after each trigger pulse, said interval being less than the interval between trigger pulses, means for converting each of the pulses generated by said first pulse generator into two pulses of equal amplitude and opposite polarity, an output circuit, means for selecting pulses of one polarity and applying same to said output circuit, a pair of similar vacuum tube stages each having one-half of the tube load impedance between the anode of the tube and a point of reference potential and the other half of the load impedance between the cathode and said point of reference potential, means for biasing said tubes slightly beyond the cut-off point, means for applying the pulses produced by said second pulse generator to the grids of said tubes in parallel, means providing two points having equal amplitude oppositely phased sinusoidal voltages to said point of reference potential, means for limiting the maximum potential of the grid of one of said tubes to the potential of one of said two points and means for limiting the maximum potential of the grid of the other of said tubes to the potential of the other of said two points, and means for applying the signals at the anode of one of said tubes and at the cathode of the other of said tubes in parallel to said output circuit.

4. A signal generator for producing an electrical signal simulating the video signal representing a moving target in a moving target indicator radar system, said generator comprising a pair of vacuum tubes each having an anode, a cathode and a control grid, equal load impedances for said tubes, one half of the load impedance for each tube being located between the anode of the tube and a point of reference potential and the other half being located between the cathode of the tube and said point of reference potential, means for applying a series of positive pulses of constant amplitude and repetition rate to the grids of said tubes in parallel, means for biasing said tubes slightly beyond cut-off, means for placing equal amplitude oppositely phased sinusoidally varying limitations on the maximum positive potentials of said grids, an output circuit, and means for applying the signals on the anode of one tube and the cathode of the other tube in parallel to said output circuit.

5. A signal generator for producing an electrical signal simulating the video signal representing a moving target in a moving target indicator radar system, said generator comprising a pair of vacuum tubes each having an anode, a cathode and a control grid, equal load impedances for said tubes, one half of the load impedance for each tube being located between the anode of the tube and a point of reference potential and the other half being located between the cathode of the tube and said point of reference potential, means for applying a series of positive pulses of constant amplitude and repetition rate to the grids of said tubes in parallel, means for biasing said tubes slightly beyond cut-off, means providing two points having equal amplitude oppositely phased sinusoidal voltages to said point of reference potential, means for limiting the maximum potential of the grid of one of said tubes to the potential of one of said two points and means for limiting the maximum potential of the grid of the other of said tubes to the potential of the other of said two points, and means for applying the signals at the anode of one of said tubes and at the cathode of the other of said tubes in parallel to said output circuit.

6. A signal generator for producing an electrical signal simulating the video signal representing a moving target in a moving target indicator radar system, said generator comprising a pair of vacuum tubes each having an anode, a cathode and a control grid, equal load impedances for said tubes, one half of the load impedance for each tube being located between the anode of the tube and a point of reference potential and the other half being located between the cathode of the tube and said point of reference potential, means for biasing said tubes slightly beyond cut-off, a transformer having a center tapped secondary winding and a sinusoidal voltage applied to its primary winding, means connecting said center tap to said point of reference potential, grid impedances connected between each of said grids and said point of reference potential, means for applying a series of positive pulses of constant amplitude and repetition rate to the grids of said tubes in parallel, a unidirectional device connected between the grid of one tube and one of the terminals of said secondary winding, a similar unidirectional device connected between the grid of the other tube and the other secondary terminal, said unidirectional devices being poled to conduct when the grid potentials exceed the terminal potentials, a resistance connected between the anode of one of said tubes and the cathode of the other of said tubes, a tap on said resistance, and an output circuit connected between said tap and said point of reference potential.

7. Apparatus as claimed in claim 6 in which said tap is adjustable and in which a neutralizing resistance equal in value to said potentiometer resistance is connected between the remaining anode and cathode of said tubes.

References Cited in the file of this patent

UNITED STATES PATENTS

| | | |
|---|---|---|
| 2,089,639 | Bedford | Aug. 10, 1937 |
| 2,266,194 | Guanella | Dec. 16, 1941 |
| 2,440,253 | Dodington | Apr. 27, 1948 |
| 2,548,796 | Houghton | Apr. 10, 1951 |